(12) United States Patent
Liu et al.

(10) Patent No.: US 12,374,516 B2
(45) Date of Patent: Jul. 29, 2025

(54) ADJUSTMENT MECHANISM FOR CIRCUIT BREAKER AND CORRESPONDING CIRCUIT BREAKER

(71) Applicant: ABB S.P.A., Milan (IT)

(72) Inventors: Wensheng Liu, Guangdong (CN); Jiancheng Ren, Guangdong (CN); Qi Zhou, Guangdong (CN); Yanfang Ye, Guangdong (CN)

(73) Assignee: ABB S.P.A., Milan (IT)

( * ) Notice: Subject to any disclaimer, the term of this patent is extended or adjusted under 35 U.S.C. 154(b) by 224 days.

(21) Appl. No.: 18/254,791

(22) PCT Filed: Dec. 14, 2020

(86) PCT No.: PCT/CN2020/136228
§ 371 (c)(1),
(2) Date: May 26, 2023

(87) PCT Pub. No.: WO2022/126335
PCT Pub. Date: Jun. 23, 2022

(65) Prior Publication Data
US 2024/0029986 A1   Jan. 25, 2024

(51) Int. Cl.
*H01H 71/10*   (2006.01)

(52) U.S. Cl.
CPC .................... *H01H 71/10* (2013.01)

(58) Field of Classification Search
CPC .... H01H 71/00; H01H 71/10; H01H 71/1009; H01H 71/52; H01H 71/526; H01H 73/00; H01H 73/02; H01H 75/00; H01H 75/02; H01H 77/00; H01H 2003/00; H01H 2003/02; H01H 2003/32; H01H 2003/323; H01H 2003/46; H01H 2003/466; H01H 83/20; H01H 2077/00
USPC ......................................................... 200/237
See application file for complete search history.

(56) References Cited

U.S. PATENT DOCUMENTS

| | | | | |
|---|---|---|---|---|
| 4,916,420 A | * | 4/1990 | Bartolo | H01H 71/526 335/189 |
| 6,291,783 B1 | | 9/2001 | Nebon et al. | |
| 7,132,912 B2 | * | 11/2006 | Busenhart | H01H 71/526 335/10 |

FOREIGN PATENT DOCUMENTS

| | | |
|---|---|---|
| CN | 102254723 A | 11/2011 |
| CN | 103311834 A | 9/2013 |
| CN | 104701775 A | 6/2015 |
| CN | 204577387 U | 8/2015 |
| CN | 110021503 A | 7/2019 |

(Continued)

*Primary Examiner* — Anthony R Jimenez
(74) *Attorney, Agent, or Firm* — GREENBERG TRAURIG, LLP

(57) ABSTRACT

An adjustment mechanism for a circuit breaker and the corresponding circuit breaker. The adjustment mechanism includes a pin adapted to move with respect to a base part of the circuit breaker along a predefined path; a first linkage coupled to the base part and adapted to drive a first terminal of the circuit breaker to move towards or away from the base part; and a second linkage coupled to a second terminal of the circuit breaker and adapted to be actuated by the pin to drive the second terminal to move towards or away from the base part. The groove has a first segment; and the second linkage is actuated by the pin and the first linkage is not actuated by the pin when the pin moves within the first segment in a first direction along the predefined path.

20 Claims, 16 Drawing Sheets

(56) References Cited

FOREIGN PATENT DOCUMENTS

| | | |
|---|---|---|
| CN | 210325660 U | 4/2020 |
| CN | 211578663 U | 9/2020 |
| EP | 0688034 A1 | 12/1995 |
| EP | 0930681 A1 | 7/1999 |
| EP | 2015413 A2 | 1/2009 |
| JP | 2016149377 A | 8/2016 |
| KR | 20100080050 A | 7/2010 |

* cited by examiner

ADJUSTMENT MECHANISM FOR CIRCUIT BREAKER AND CORRESPONDING CIRCUIT BREAKER

CROSS-REFERENCE TO RELATED APPLICATIONS

This is a national stage application claiming priority to International patent application Serial No.: PCT/CN2020/136228, filed on Dec. 14, 2020; which is herein incorporated by reference in its entirety.

FIELD

Example embodiments of the present disclosure generally relate to the field of electrical equipment, and in particular, to an adjustment mechanism for a circuit breaker and the corresponding circuit breaker.

BACKGROUND

In the field of electrical equipment, a circuit breaker is typically connected to a main circuit so as to cut off the main circuit when the current in the circuit exceeds a threshold. The conventional circuit breaker only has two operating positions, i.e., a connection position and a disconnection position. However, the conventional circuit breaker does not have a test position at which a test of the circuit breaker can be carried out to reflect an overall operating state of the circuit breaker. Thus, the circuit breaker needs to be pulled out for maintenance on a regular basis. Since there is no test position, the conventional circuit breaker must include an additional test circuit to carry out the test operation. When the circuit breaker is pulled out, terminals of the test circuit would have to be pulled out as well, which brings inconvenience to the maintenance work. Thus, how to add a test position for the circuit breaker and switch the circuit breaker among the test position, the connection position and the disconnection position in a straightforward manner remains a challenge.

SUMMARY

In general, example embodiments of the present disclosure provide a solution for switching the circuit breaker among the test position, the connection position and the disconnection position conveniently.

In a first aspect, there is provided an adjustment mechanism for a circuit breaker. The adjustment mechanism comprises a pin adapted to move with respect to a base part of the circuit breaker along a predefined path; a first linkage coupled to the base part and adapted to drive a first terminal of the circuit breaker to move towards or away from the base part, the first linkage comprising a groove in which the pin moves; and a second linkage coupled to a second terminal of the circuit breaker and adapted to be actuated by the pin to drive the second terminal to move towards or away from the base part, the groove comprises a first segment; and the second linkage is actuated by the pin and the first linkage is not actuated by the pin when the pin moves within the first segment in a first direction along the predefined path.

In some example embodiments, the groove further comprises a second segment in communication with the first segment; and the first linkage is actuated by the pin and the second linkage is not actuated by the pin when the pin moves within the second segment in the first direction along the predefined path.

In some example embodiments, the first terminal is arranged on a frame and the second terminal is arranged on a terminal support; and the second linkage is hinged to the terminal support.

In some example embodiments, the adjustment mechanism further comprises a third linkage coupled to the frame at one end and hinged to the second linkage at the other end.

In some example embodiments, the terminal support comprises a bending part along which the pin moves in a second direction opposite to the first direction; and the first linkage is actuated by the pin and the second linkage is not actuated by the pin when the pin moves along the bending part in the second direction.

In some example embodiments, the adjustment mechanism further comprises a fourth linkage hinged to the base part at one end, and a fifth linkage hinged to the fourth linkage at one end and hinged to the first linkage at the other end, when the pin moves within the second segment in the first direction along the predefined path, the first linkage drives the fifth linkage to cause the fourth linkage to rotate with respect to the base part.

In some example embodiments, the fourth linkage and the fifth linkage are hinged to each other by a lever, the frame comprises two hooks coupled to both ends of the lever respectively, and when the first linkage moves, the fifth linkage 205 is actuated, such that the lever moves to actuate the frame to move towards or away from the base part.

In some example embodiments, the second linkage comprises a protrusion, and when the pin moves within the first segment in the first direction along the predefined path, the pin pushes the protrusion to actuate the second linkage.

In some example embodiments, the first linkage further comprises a recessed part between the first and second segments, when the pin moves to an end position in the first direction along the predefined path, the recessed part provides a space for accommodating the pin.

In some example embodiments, the frame further comprises a protruding part; the adjustment mechanism further comprises an indicating part adjacent to the protruding part configured to indicate whether the hook is coupled to the lever; and when the hook is coupled to the lever, the protruding part detaches from the indicating part.

In some example embodiments, the pin is provided at an end face of a worm gear meshed to a worm.

In some example embodiments, the adjustment mechanism further comprises a stop nut provided at the worm and adapted to limit the range of movement of the worm.

In some example embodiments, the pin is provided at an end face of a worm gear meshed to a worm and the first linkage, the worm gear and the fifth linkage are arranged such that when the pin moves to an end position of the first segment in the first direction along the predefined path, the fifth linkage is provided approximately tangent to the worm gear.

In some example embodiments, the first terminal is a terminal for electrical connection, and the second terminal is a terminal for testing.

In a second aspect, a circuit breaker is provided. The circuit breaker comprises an adjustment mechanism of the first aspect.

BRIEF DESCRIPTION OF THE DRAWINGS

Through the following detailed description with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein.

Throughout the drawings, the same or similar reference numerals represent the same or similar element.

DETAILED DESCRIPTION

Figure 1A:
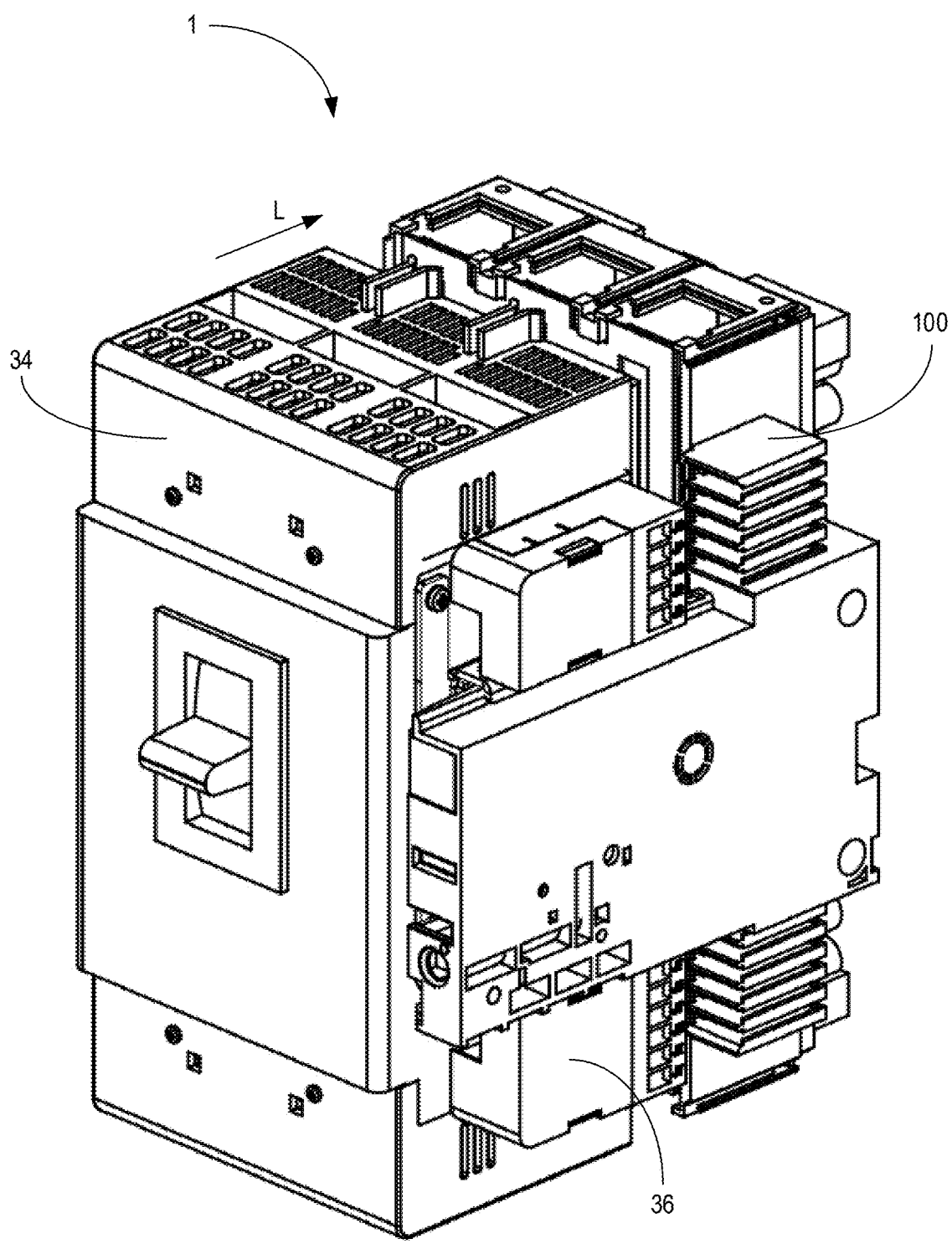
FIGS. 1A-1C illustrate different adjustment stages of the circuit breaker in accordance with an example embodiment of the present disclosure.

Principles of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

It should be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As discussed above, the existing circuit breaker does not have a test position at which a test of the circuit breaker can be carried out to reflect an overall operating state of the circuit breaker, which brings great inconvenience for the user.

According to embodiments of the present disclosure, a test position is provided in the circuit breaker. When the user operates the circuit breaker with a tool, the circuit breaker will be first put into the test position. Then, if the user further operates the circuit breaker with the tool, the circuit breaker will be further put into a connection position. In this way, the user can operate the circuit breaker in a straightforward manner without the need of altering the operating manner.

Example embodiments will be described in more detail hereinafter in accordance with FIGS. 1A-8.

Figure 1B:
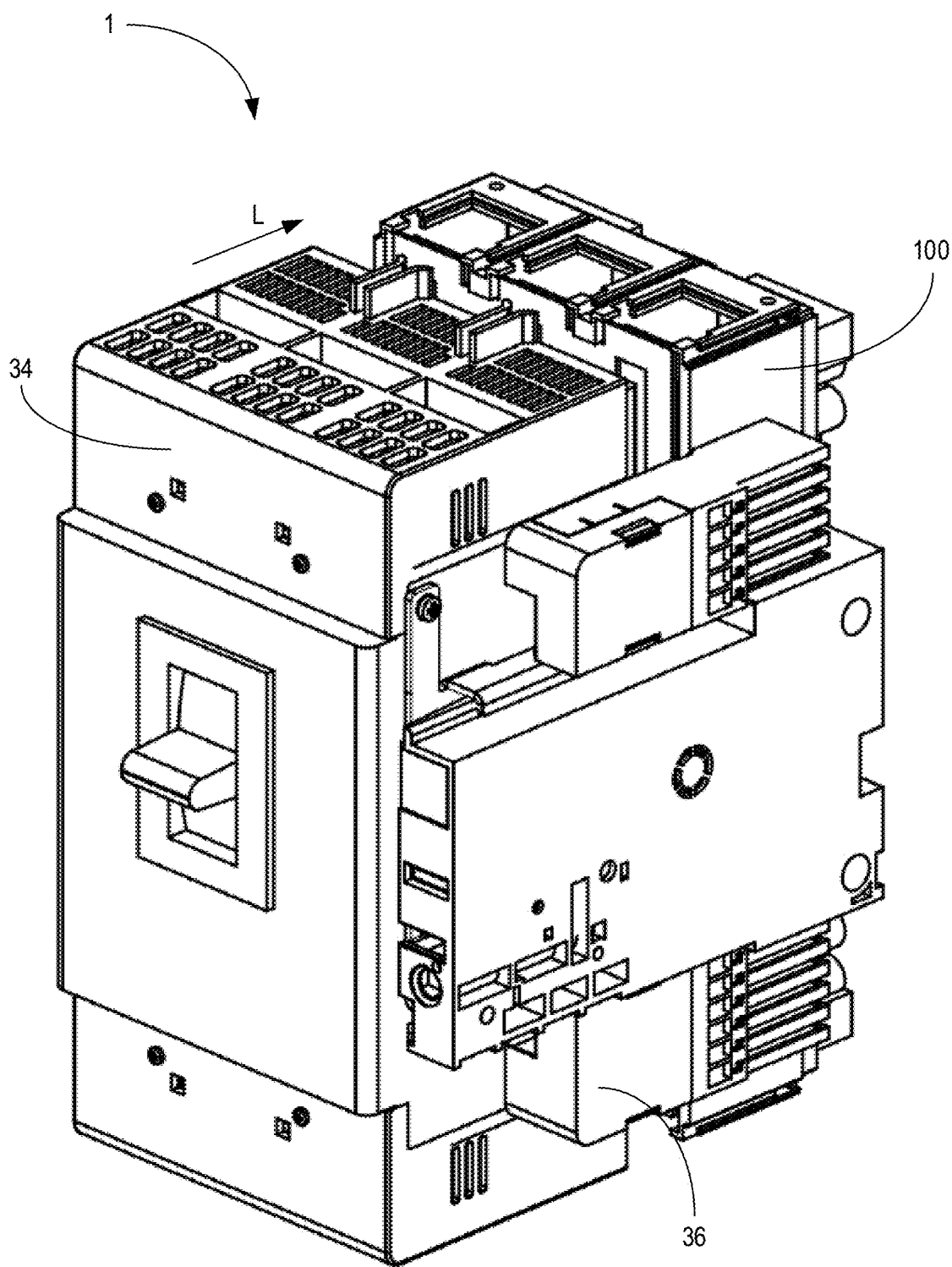
Figure 1C:
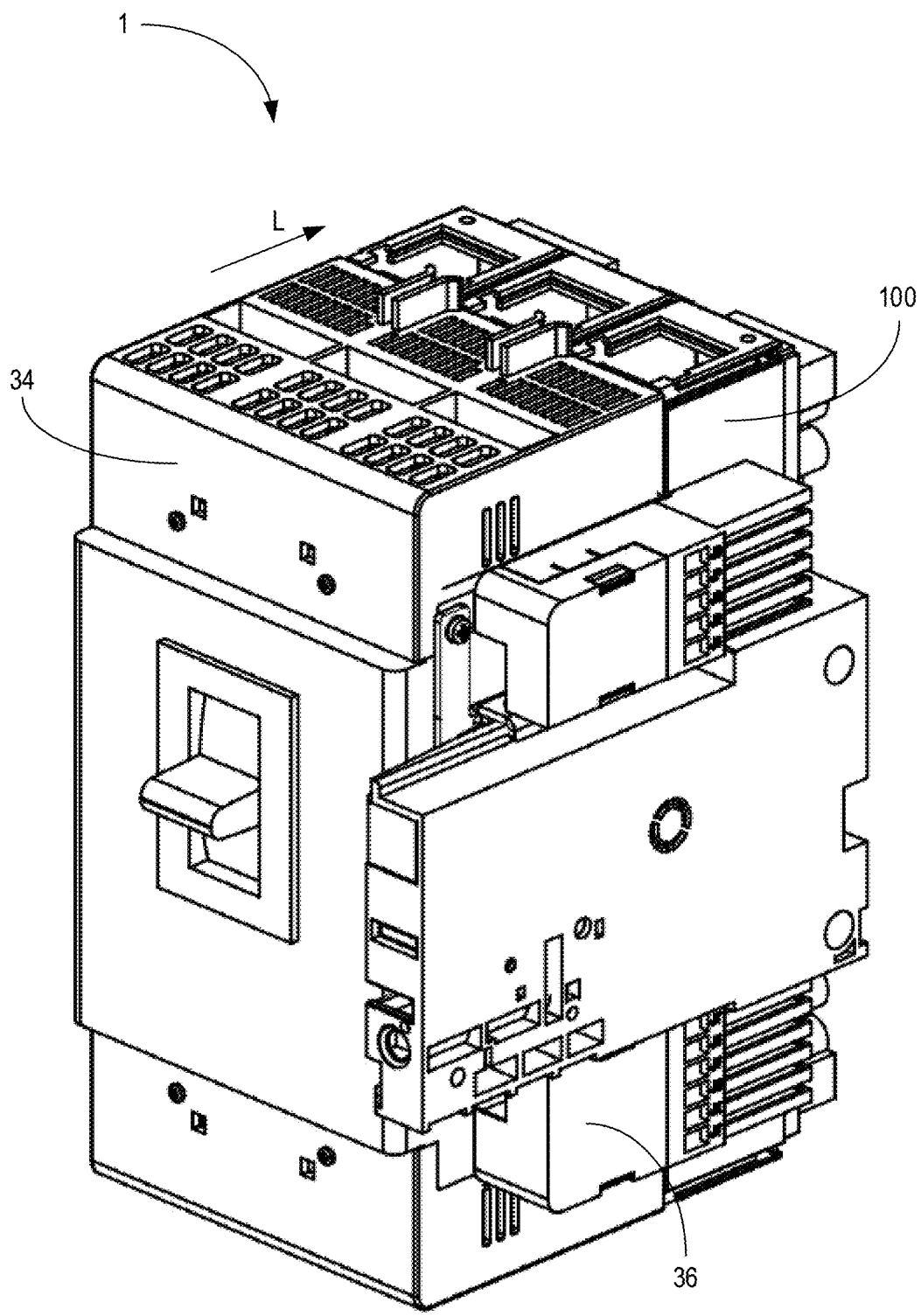

Referring to FIGS. 1A-1C first, FIGS. 1A-1C illustrate different adjustment stages of the circuit breaker 1 in accordance with an example embodiment of the present disclosure. The circuit breaker 1 as illustrated generally includes a base part 100, a first terminal 34 and a second terminal 36. In some embodiments, the first terminal 34 may be a terminal for electrical connection. In some embodiments, the second terminal 36 may be a terminal for testing. The first terminal 34 is adapted to move towards the base part 100 along a sliding direction L to establish an electrical connection between the first terminal 34 and the base part 100. The first terminal 34 is also adapted to move away from the base part 100 in a direction opposite to the sliding direction L so as to be disconnected from the base part 100. Likewise, the second terminal 36 is adapted to move towards the base part 100 along the sliding direction L to establish an electrical connection for testing between the second terminal 36 and the base part 100. The second terminal 36 is also adapted to move away from the base part 100 in the direction opposite to the sliding direction L so as to be disconnected from the base part 100.

FIG. 1A illustrates that both the first and second terminals 34, 36 are disconnected from the base part 100. In other words, the circuit breaker 1 as illustrated is in a disconnection position. The first and second terminals 34, 36 can be moved to different working positions, as illustrated in FIGS. 1B-1C. As shown in FIG. 1B, the second terminal 36 is connected to the base part 100, and the first terminal 34 is disconnected from the base part 100. As shown in FIG. 1C, both the first and second terminals 34, 36 are connected to the base part 100.

Figure 2A:
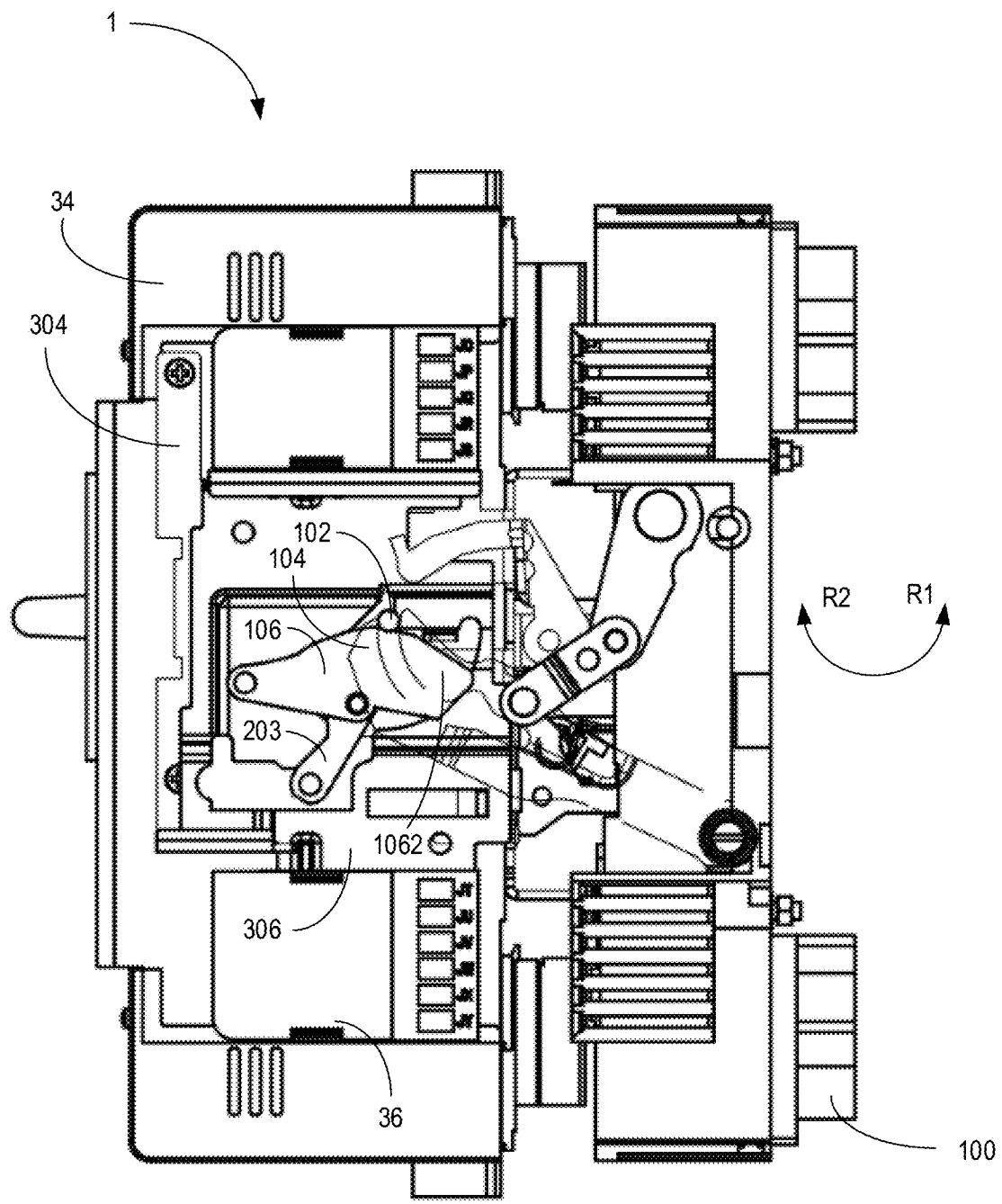
FIGS. 2A-2D illustrate different adjustment stages of the adjustment mechanism in accordance with an example embodiment of the present disclosure.

FIGS. 2A-2D illustrate different adjustment stages of an adjustment mechanism 10 in accordance with an example embodiment of the present disclosure. As illustrated, the adjustment mechanism 10 generally includes a pin 102, a first linkage 104 and a second linkage 106. The pin 102 can move with respect to the base part 100 of the circuit breaker 1 along a predefined path. As illustrated in FIG. 2A, the first linkage 104 is coupled to the base part 100 and can drive the first terminal 34 of the circuit breaker 1 to move towards or away from the base part 100. As illustrated, the second linkage 106 is coupled to the second terminal 36 of the circuit breaker 1 and can be actuated by the pin 102 to drive the second terminal 36 to move towards or away from the base part 100. The specific adjustment stages of the adjustment mechanism 10 would be described in detail hereinafter.

Figure 2B:
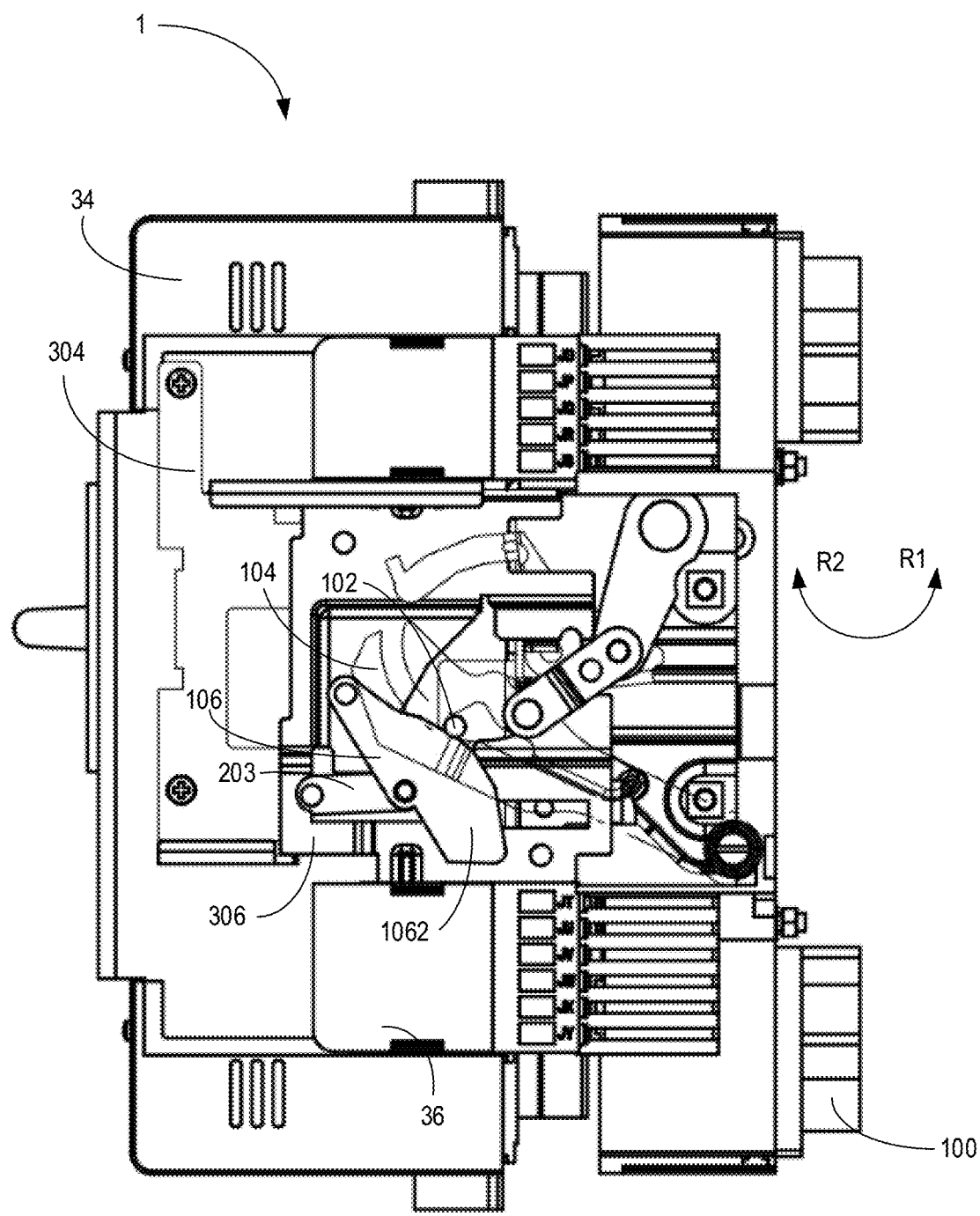
Figure 2C:
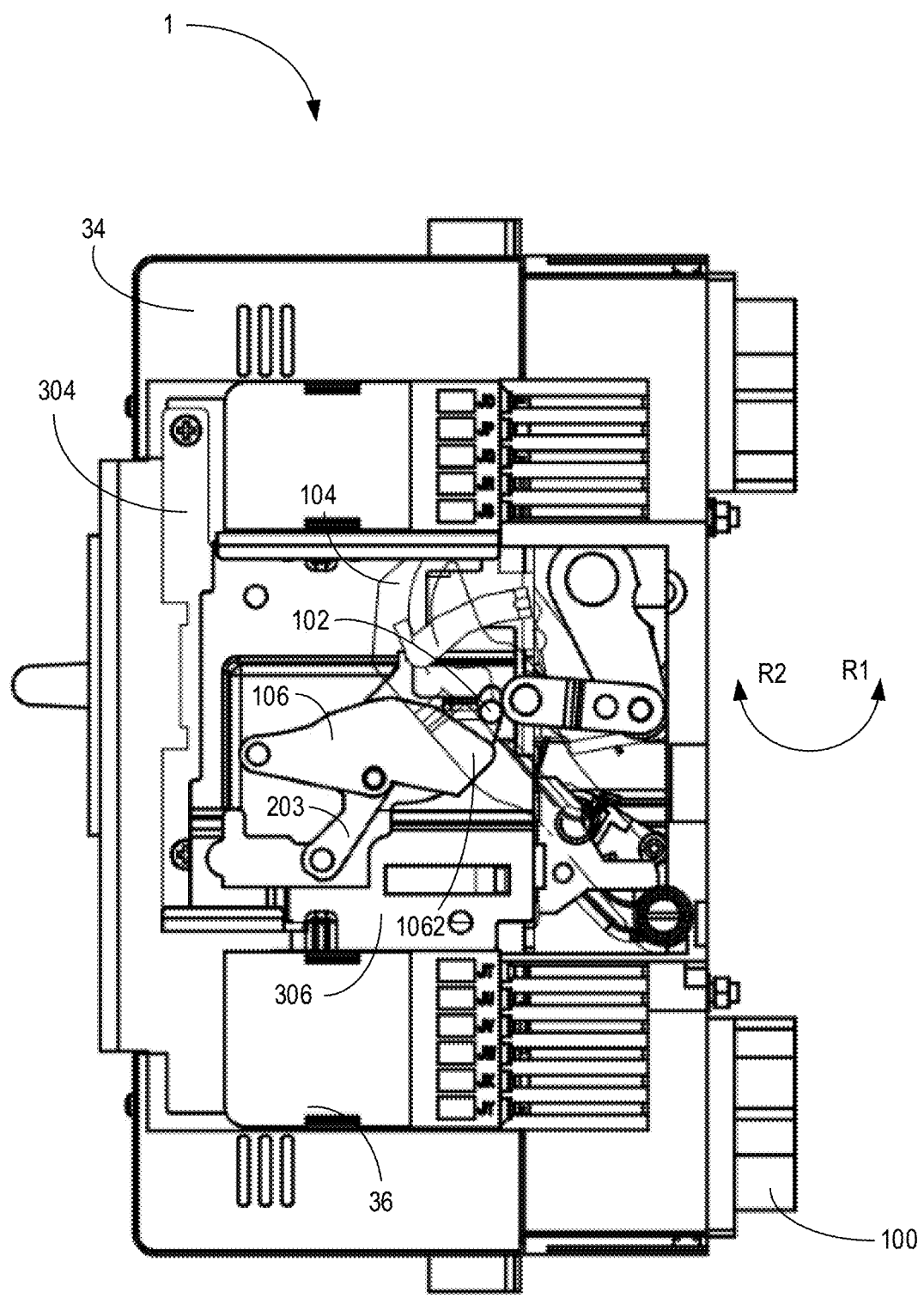
Figure 3A:
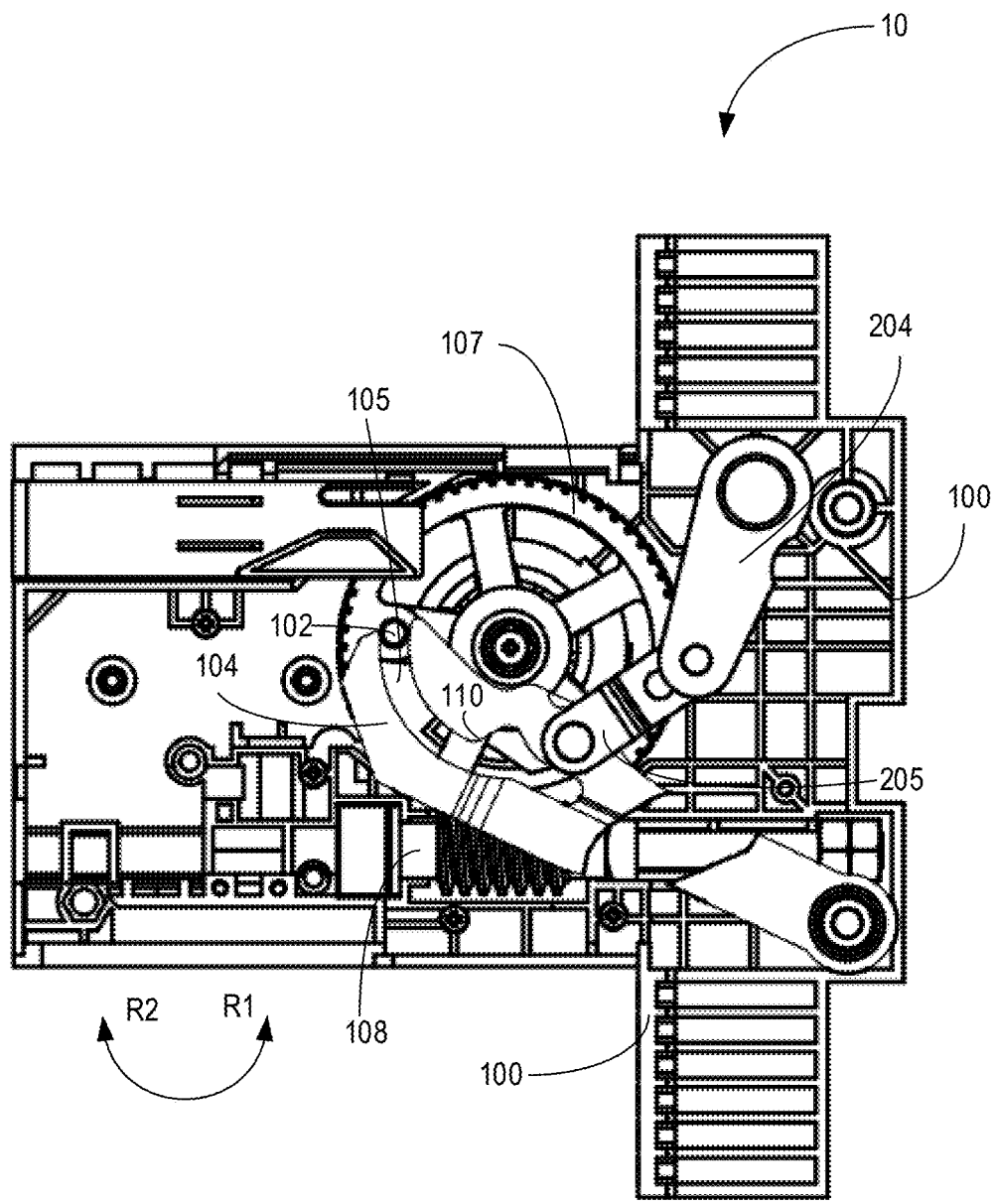
FIGS. 3A-3D illustrate different adjustment stages for the first terminal in accordance with an example embodiment of the present disclosure.
Figure 3B:
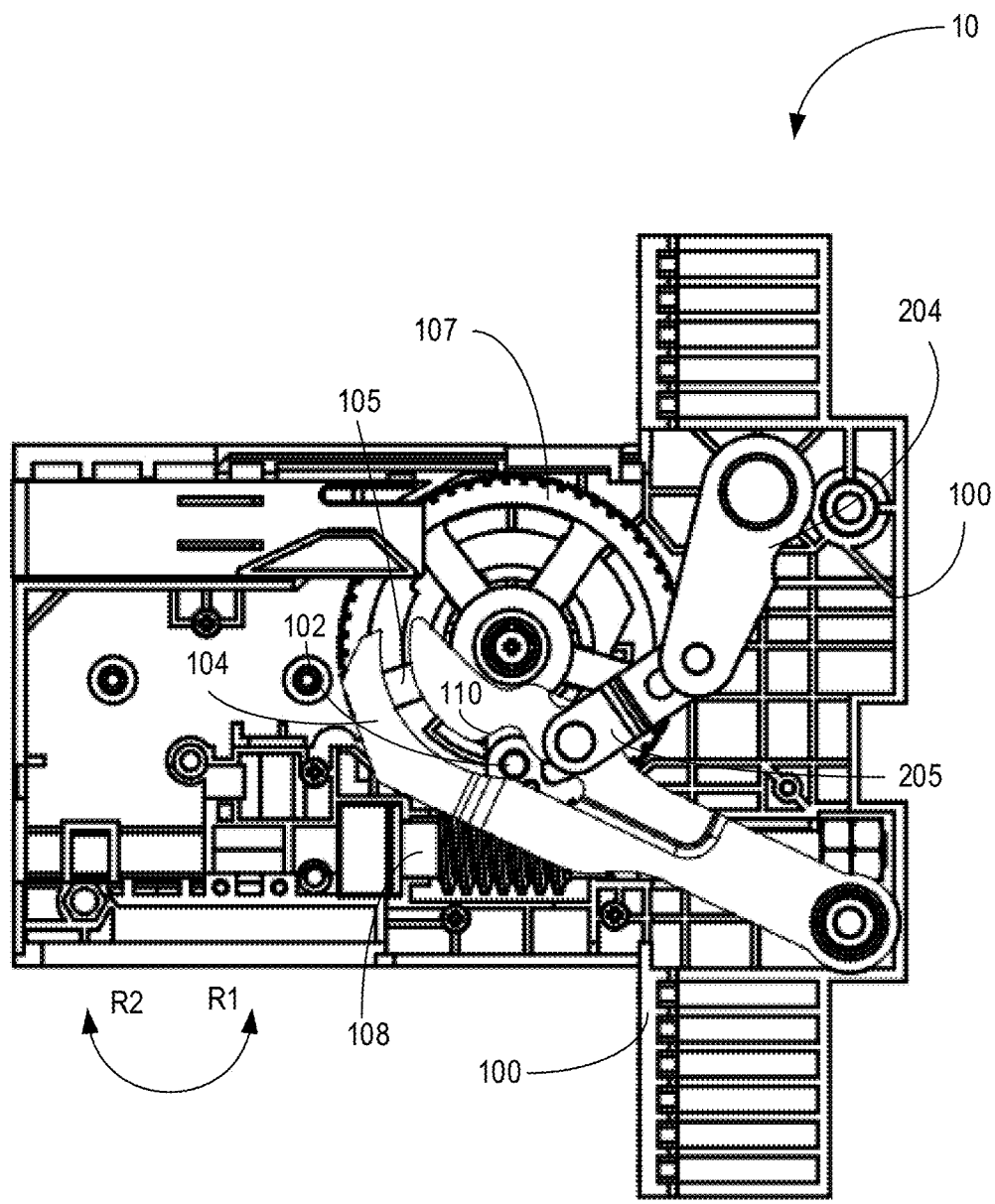
Figure 3C:
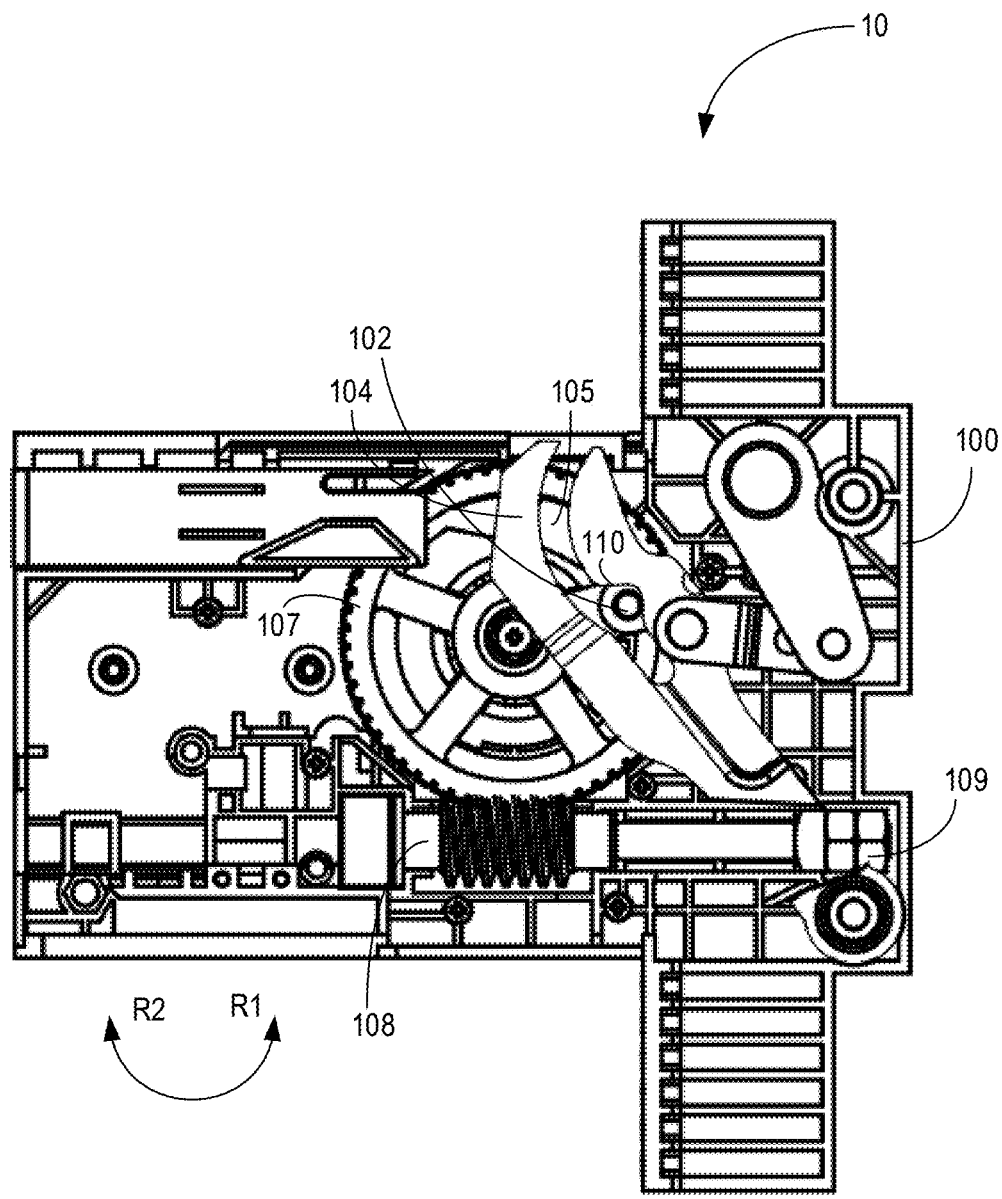

FIGS. 3A-3D illustrate different adjustment stages for the first terminal 34 in accordance with an example embodiment of the present disclosure. FIGS. 3A-3C generally correspond to FIGS. 2A-2C. In FIGS. 3A-3D, the second linkage 106 is omitted so as to clearly illustrate the operation of the first linkage 104 and other components of the adjustment mechanism 10.

Figure 4:
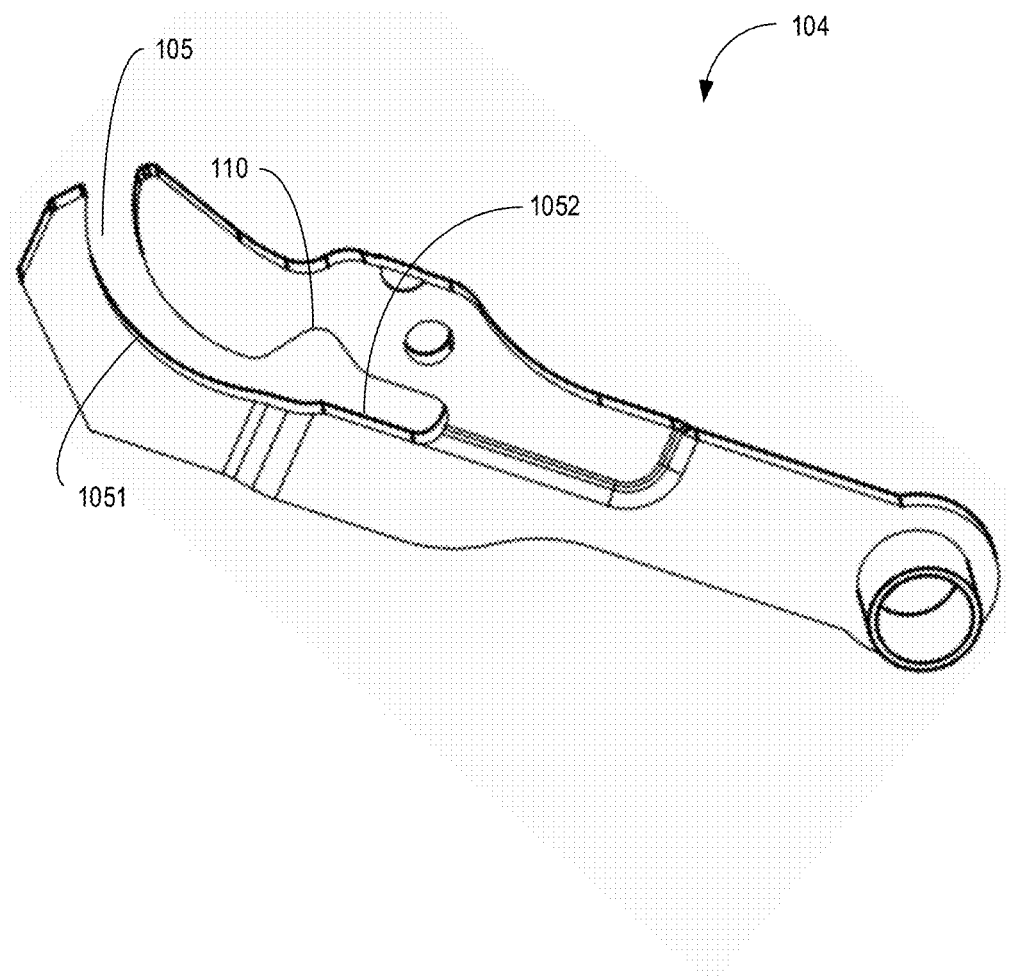
FIG. 4 illustrates a perspective view of a first linkage in accordance with an example embodiment of the present disclosure.

FIG. 4 illustrates a perspective view of the first linkage 104 in accordance with an example embodiment of the present disclosure. As illustrated, the first linkage 104 includes a groove 105. The pin 102 is adapted to move in the groove 105. As illustrated, the groove 105 includes a first segment 1051.

As shown in FIG. 2A, both the first and second terminals 34, 36 are disconnected from the base part 100. That is, the circuit breaker 1 is in the disconnection position. Referring to FIGS. 2A, 3A and 4, when the pin 102 moves within the first segment 1051 in a first direction R1 along the predefined path, the pin 102 pushes the second linkage 106 to move. Starting from the position illustrated in FIG. 2A, the pin 102 moves along the first direction R1 within the first segment 1051 to a position illustrated in FIG. 2B. As shown in FIG. 2B, the second terminal 36 is connected to the base part 100, and the first terminal 34 is disconnected from the base part 100. That is, the adjustment mechanism 10 is in a test position.

As illustrated in FIG. 4, the shape of the first segment 1051 of the groove 105 of the first linkage 104 is designed to be consistent with a part of the predefined path of the pin 102. For example, in some example embodiments, the first segment 1051 may have a generally circular profile. It is to be understood that this is merely an example, without suggesting any limitation as to the scope of the disclosure. In this manner, the first linkage 104 is not actuated by the pin 102 when the pin 102 moves within the first segment 1051 in the first direction R1. Thus, in a period from the adjustment stage as shown in FIGS. 2A and 3A to the adjustment stage as shown in FIGS. 2B and 3B, the second terminal 36 will be actuated to move towards the base part 100 while the first terminal 34 will not be actuated to move towards the base part 100.

According to example embodiments of the present disclosure, by actuating the pin 102, the connection between the second terminal 36 and the base part 100 will first be established while the first terminal 34 and the base part 100 are still kept disconnected. This is illustrated in FIG. 2B. In other words, the test position is added to the circuit breaker 1 to allow the circuit breaker 1 to carry out a test operation prior to establishing the electrical connection. Since the users are allowed to inspect and repair the second terminal 36 at the test position when the first terminal 34 is disconnected from the base part 100, the maintenance of the second terminal 36 can be carried out in a convenient and safe manner for the users. In a case that the first terminal 34 is a terminal for electrical connection and the second terminal 36 is a terminal for test, the maintenance of a test circuit formed by the terminal for testing can be carried out conveniently and safely.

In some example embodiments, as illustrated in FIG. 4, the groove 105 may further include a second segment 1052 in communication with the first segment 1051. Starting from the position illustrated in FIGS. 2B and 3B, the pin 102 may be actuated to further move to a position illustrated in FIGS. 2C and 3C within the second segment 1052 along the predefined path in the first direction R1. Since the pin 102 starts to detach from the second linkage 106, as illustrated in FIG. 2B, the further movement of the pin 102 along the first direction will not exert a force on the second linkage 106. As a result, the second terminal 36 is kept in contact with the base part 100, as illustrated. However, the movement of the pin 102 along the second segment 1052 will actuate the first linkage 104 to the position as illustrated in FIGS. 2C and 3C. As shown in FIGS. 2C and 3C, both the first and second terminals 34, 36 are connected to the base part 100. That is, the adjustment mechanism 10 is in a connection position.

In some example embodiments, as illustrated in FIG. 4, the shape of the second segment 1052 may be designed to be inconsistent with the predefined path of the pin 102. For example, in some example embodiments, the second segment 1052 may have a generally straight profile. It is to be understood that this is merely an example, without suggesting any limitation as to the scope of the disclosure. In this manner, when the pin 102 moves within the second segment 1052 in the first direction R1, it will push the first linkage 104 to rotate relative to the base part 100. With reference back to FIGS. 2B and 2C, when the pin 102 further moves along the first direction R1, the pin 102 starts to actuate the first terminal 34 to move towards the base part 100. In this way, the connection between the first terminal 34 and the base part 100 can be established.

According to example embodiments of the present disclosure, when actuating the pin 102 in the first direction R1, the second terminal 36 will be first actuated towards the base part 100 to connect to the base part 100 while the first terminal 34 remains disconnected from the base part 100. As the pin 102 moves further in the first direction R1, the first terminal 34 starts to be actuated towards base part 100 to connect to the base part 100 while the second terminal 36 remains connected to the base part 100.

With the above arrangement, the movements of the first and second terminals 34, 36 would not interfere with each other. Moreover, since the first terminal 34 is locked when actuating the second terminal 36, the operation of the first terminal 34 will not be affected by other external factors, e.g., the vibration of the circuit breaker 1. Likewise, the operation of the second terminal 36 will also not be affected.

In some example embodiments, as shown in FIGS. 2A-2D, the first terminal 34 is arranged on a moving part of the circuit breaker 1, which is supported by a frame 304. The second terminal 36 is arranged on a terminal support 306. With such an arrangement, the movement of the frame 304 would drive the moving part and the first terminal 34 to move. Likewise, the movement of the terminal support 306 would drive the second terminal 36 to move.

Figure 5:
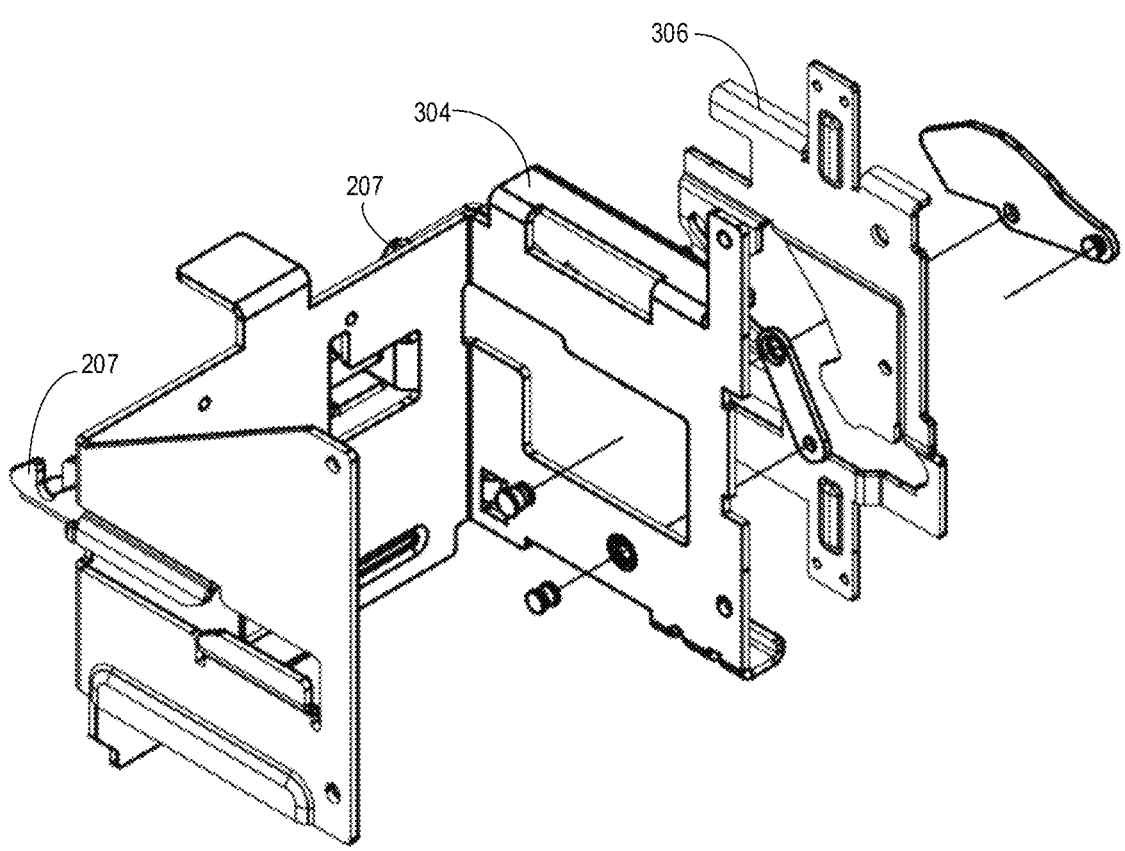
FIG. 5 illustrates a perspective view of the first and terminal supports in accordance with an example embodiment of the present disclosure.
Figure 6:
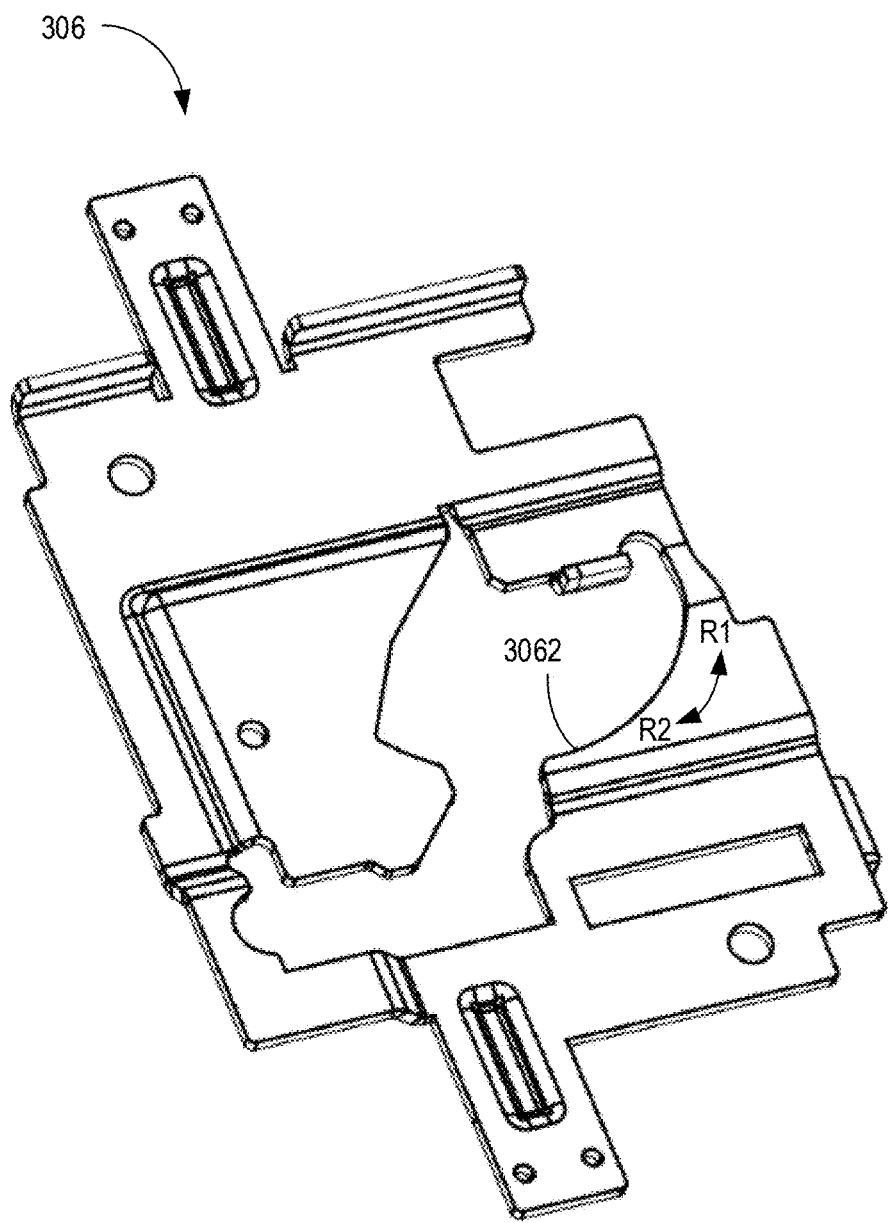
FIG. 6 illustrates a perspective view of the terminal support in accordance with an example embodiment of the present disclosure, which shows a bending part.

FIG. 5 illustrates a perspective view of the frame 304 and terminal support 306 in accordance with an example embodiment of the present disclosure. As discussed above, the first terminal 34 (not shown in FIG. 5) may be provided on the moving part of the circuit breaker 1 and the second terminal 36 (not shown in FIG. 5) may be provided on the terminal support 306. FIG. 6 illustrates a perspective view of the terminal support 306 in accordance with an example embodiment of the present disclosure. With reference back to FIG. 2A-2B, the second linkage 106 may be hinged to the terminal support 306.

In some example embodiments, as illustrated in FIG. 2A, the adjustment mechanism 10 may further include a third linkage 203. The third linkage 203 may be coupled to the frame 304 at one end and coupled to the second linkage 106 at the other end.

While the pin 102 moves in the first segment 1051 along the first direction R1, as illustrated in FIGS. 2A-2B, since the frame 304 is kept stationary, the hinge between the frame 304 and the third linkage 203 is also kept stationary. As a result, the rotation of the second linkage 106 will actuate the terminal support 306 to move. Accordingly, the second terminal 36 can be actuated to move towards the base part 100.

Accordingly, by means of the interaction of the third linkage 203, the second linkage 106 and the frame 304, the movement of the second linkage 106 can be controlled in a stable manner.

The process of detaching the first terminal 34 and the second terminal 36 from the base part 100 will be discussed hereinafter. During the detaching process, the pin 102 moves along the predefined path discussed above but in a second direction R2 opposite to the first direction R1. Not all figures of the detaching process are shown for brevity. For example, the movement of the pin 102 along the second segment 1052 in the second direction R2 is exemplarily illustrated in FIG. 3D. Further, the movement of the pin 102 along the first segment 1051 in the second direction R2 is exemplarily illustrated in FIG. 2D.

In some example embodiments, as illustrated in FIG. 6, the terminal support 306 includes a bending part 3062. While the pin 102 moves to an end position of the predefined path along the first direction R1, the pin 102 is pushed at the highest position or an end position of the bending part 3062. Next, the pin 102 will be actuated along the second direction R2 to pull out the first terminal 34. When the pin 102 is actuated along the second direction R2, the pin 102 may move along the bending part 3062. Due to the contact between the pin 102 and the bending part 3062, the terminal support 306 is kept stationary and will not be actuated by the pin 102. As a result, the second terminal 36 will remain in contact with the base part 100.

Figure 2D:
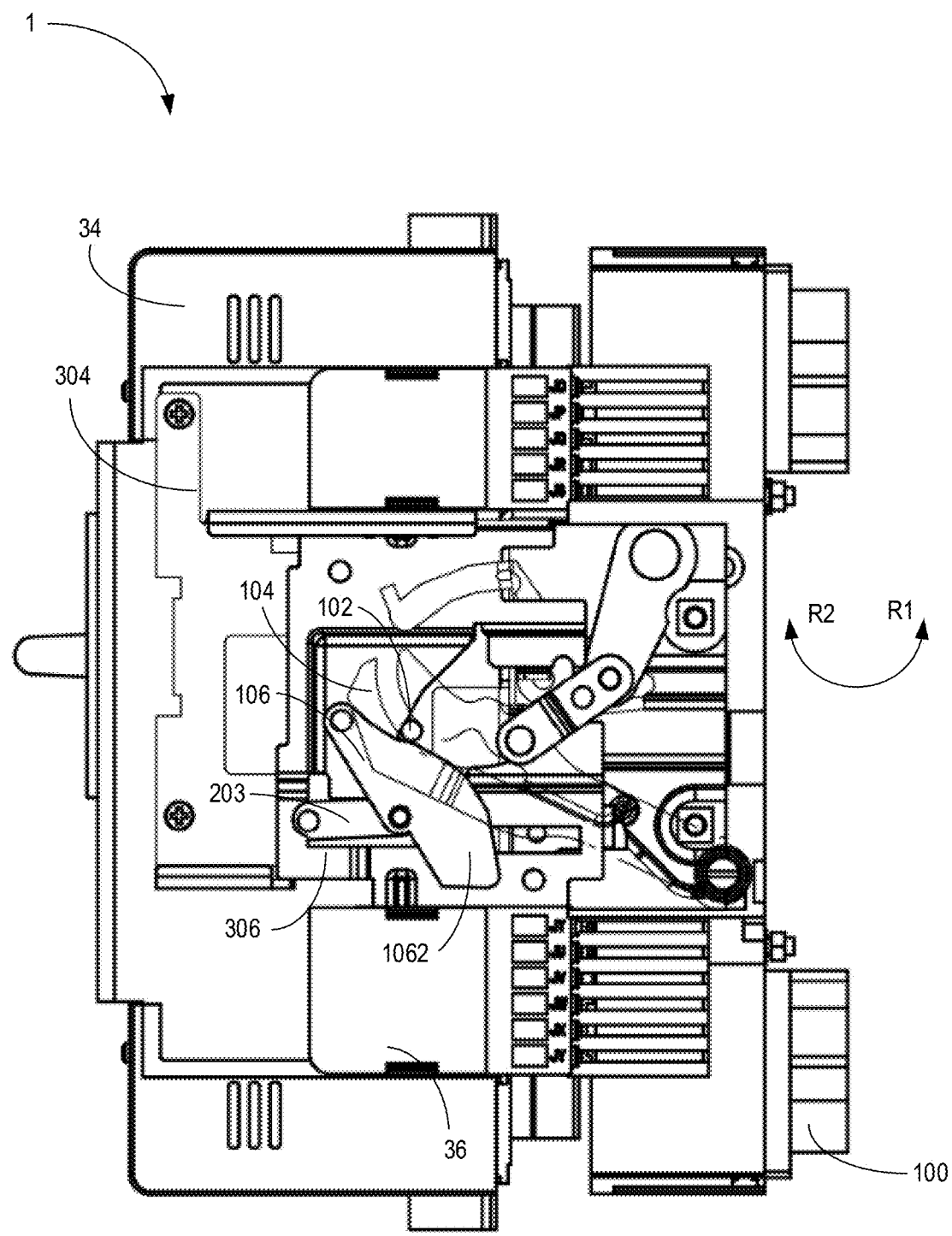

As to the control of the first terminal 34, during the movement of the pin 102 along the second direction R2, the pin 102 moves in the second segment 1052 of the first linkage 104. As illustrated in FIG. 2D, the movement of the pin 102 will cause the first linkage 104 to drive the first terminal 34 to move away from the base part 100. In other words, when the pin 102 moves along the bending part 3062 in the second direction R2, the first linkage 104 would be actuated by the pin 102 and the second linkage 106 would not be actuated by the pin 102. Accordingly, the movements of the first and second terminals 34, 36 do not interfere with each other. The risk of misoperation can thus be greatly reduced.

In some example embodiments, as illustrated in FIGS. 3A-3D, the adjustment mechanism 10 may further include a fourth linkage 204 and a fifth linkage 205. The fourth linkage 204 may be hinged to the base part 100 at one end. The fifth linkage 205 may be hinged to the fourth linkage 204 at one end and hinged to the first linkage 104 at the other end. While the pin 102 moves within the second segment 1052 along the predefined path, the first linkage 104 drives the fifth linkage 205 to cause the fourth linkage 204 to rotate with respect to the base part 100.

Figure 7:
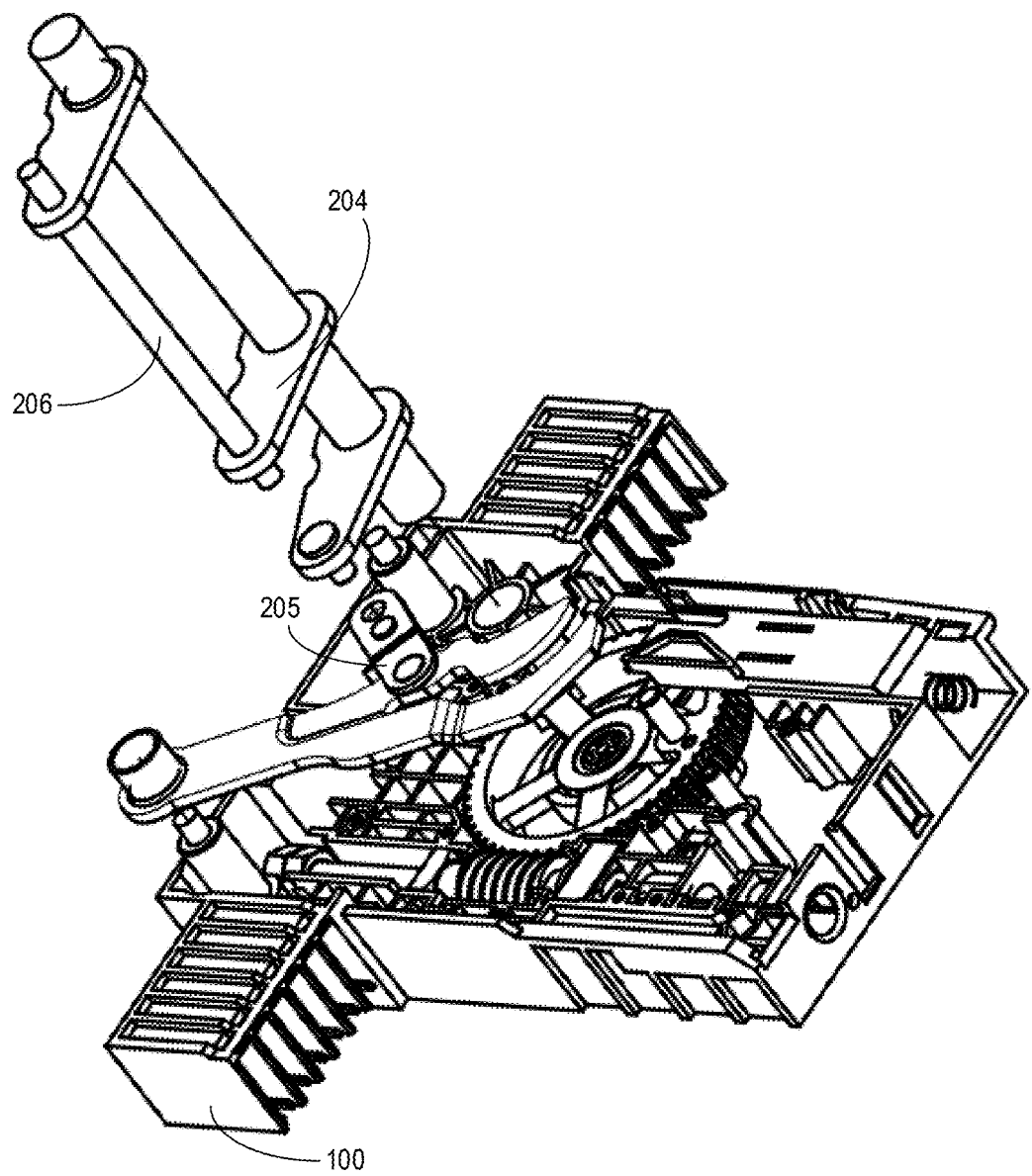
FIG. 7 illustrates an explosive view of components of the adjustment mechanism for adjusting the first terminal in accordance with an example embodiment of the present disclosure.

FIG. 7 illustrates an exploded view of components of the adjustment mechanism for adjusting the first terminal in accordance with an example embodiment of the present disclosure. As illustrated, the fourth linkage 204 and the fifth linkage 205 are hinged to each other by a lever 206. With reference to FIG. 5, the frame 304 may include two hooks 207. Each hook 207 is coupled to a respective end of the lever 206. The movement of the lever 206 will cause the hook 207 to pull the frame 304 to move. As a result, with reference to FIGS. 3B-3D, when the first linkage 104 moves, the fifth linkage 205 is actuated accordingly, such that the lever 206 moves to actuate the frame 304 to move towards or away from the base part 100.

In some example embodiments, as illustrated in FIGS. 2A-2D, the second linkage 106 includes a protrusion 1062. When the pin 102 moves within the first segment 1051 in the first direction R1 along the predefined path, the pin 102 pushes the protrusion 1062 to actuate the second linkage 106. Owing to the presence of the protrusion 1062, the control of the second linkage 106 can be made rather accurately by designing the profile of the protrusion 1062.

In some example embodiments, as shown in FIG. 4, the first linkage 104 further includes a recessed part 110 between the first and second segments 1051, 1052. When the pin 102 moves to an end position of the predefined path in the first direction R1 along the groove 105 before transiting to the second direction R2, the recessed part 110 provides a relatively large space for accommodating the pin 102, which can be clearly seen from FIG. 3C.

In this way, when the pin 102 moves to the end position along the first direction R1, it will not hit the first linkage 104 directly due to the presence of the space provided by the recessed part 110. In other words, the space can prevent the direct impingement between the pin 102 and the first linkage 104.

Moreover, as illustrated in FIG. 3C, the pin 102 may fall into the recessed part 110 at the end position, which will produce a tactile indication to the user to allow the user to be aware of that the pin 102 has moved to the end position in the first direction R1. In this way, the state of the pin 102 within the circuit breaker can be indicated to the user.

Figure 8:
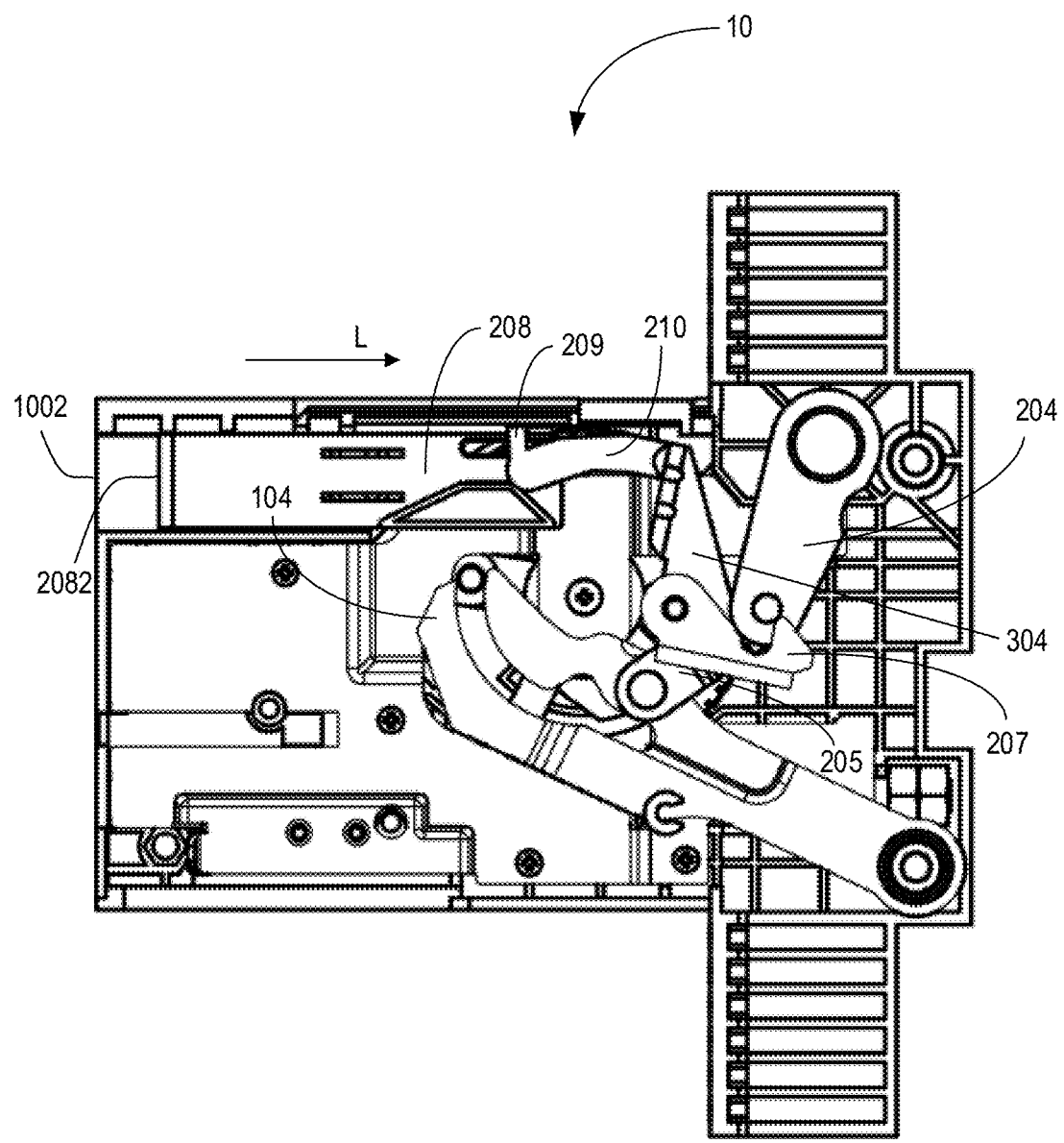
FIG. 8 illustrates an indicating part in accordance with an example embodiment of the present disclosure.

In some cases, the first terminal 34 or the moving part of the circuit breaker 1 needs be repaired or replaced if a failure occurs. When the first terminal 34 is detached from the remaining parts of the circuit breaker 1 for maintenance and a new one is mounted onto the remaining parts, it is necessary to let the user know whether they are correctly coupled to each other. FIG. 8 illustrates such an indicating mechanism in accordance with an example embodiment of the present disclosure.

In some example embodiments, as shown in FIG. 8, the frame 304 as illustrated includes a protruding part 209. The adjustment mechanism 10 further includes an indicating part 208 which is adjacent to the protruding part 209. The indicating part 208 is configured to indicate whether the hook 207 is coupled to the lever 206. The lever 206, the hook 207, the indicating part 208 and the protruding part 209 are configured such that when the hook 207 is coupled to the lever 206, the protruding part 209 detaches from the indicating part 208. In this way, the indicating part 208 is allowed to move in a direction opposite to the sliding direction L. Therefore, a front surface 2082 of the indicating part 208 can be made to be aligned with a front face 1002 of the adjustment mechanism 10. In this way, the user can see the alignment of the two surfaces and then know that the hook 207 and the lever 206 are correctly coupled to each other.

In some example embodiments, as illustrated in FIGS. 3A-3D, the pin 102 is provided at an end face of a worm gear 107 meshed to a worm 108. By twisting the worm 108 in an easy manner, the pin 102 can be controlled accordingly. In this way, only by twisting the worm 108 with a tool, the worm gear 107 will be actuated. Accordingly, the pin 102 on the end face of the worm gear 107 will be rotated in rotational directions R1 or R2. The worm gear 107 is coupled to the base part 100 and the rotation of the worm gear 107 will cause the pin 102 to rotate either in the first direction R1 or in the second direction R2.

It is to be understood that the worm gear 107 and the corresponding worm 108 illustrated herein are only for the purpose of illustration, without suggesting any limitations. In other example embodiments, other forms of transmission mechanisms may be used to actuate the pin 102.

In some example embodiments, as illustrated in FIG. 3B, when the pin 102 moves to an end position of the first segment 1051 in the first direction R1 along the predefined path, the fifth linkage 205 is provided approximately tangent to the worm gear 107. Accordingly, when the pin 102 moves to the position as shown in FIG. 3B, the linear velocity of the pin 102 is nearly parallel to that of the fifth linkage 205. In this way, the pin 102 can exert a considerable force on the fifth linkage 205, which effectively reduces the external force required for rotating the pin 102. Therefore, the user can operate the circuit breaker 1 in a much easier manner.

Figure 3D:
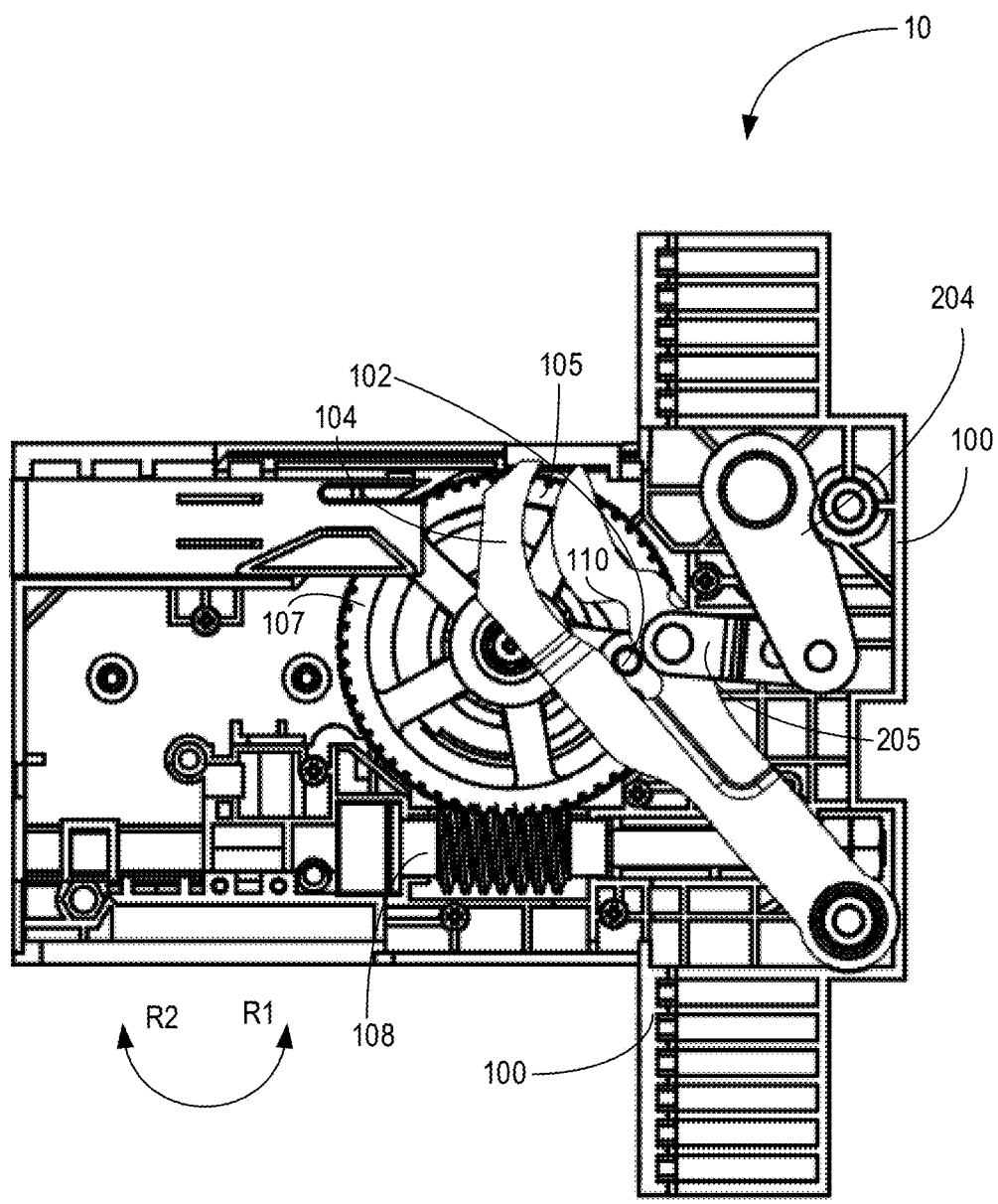

In some example embodiments, as shown in FIG. 3D, the adjustment mechanism may further include a stop nut 109 provided at the worm 108. The stop nut 109 is adapted to limit the range of movement of the worm 108. In this way, the stroke of the worm 108 and thus the stroke of the pin 102 can be predefined and easily controlled.

In some example embodiments, as illustrated in FIG. 3A, since the shape of the first segment 1051 of the groove 105 of the first linkage 104 is designed to be consistent with the predefined path of the pin 102, the pin 102 may be actuated along the first segment 1051 in a smooth manner. In other words, the pin 102 can reach the position shown in FIG. 3B in a fast manner. Therefore, the user does not have to twist the worm 108 by too many rotations, which allows the user to operate the circuit breaker 1 in an effective manner.

Compared with the conventional solution, the circuit breaker 1 according to example embodiments of the present disclosure incorporates the test function and the connection function of the circuit breaker 1 together to allow the user to operate the circuit breaker 1 in an effective way.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An adjustment mechanism for a circuit breaker, comprising:
   a pin adapted to move with respect to a base part of the circuit breaker along a predefined path;
   a first linkage coupled to the base part and adapted to drive a first terminal of the circuit breaker to move towards or away from the base part,
      the first linkage comprising a groove in which the pin moves; and
   a second linkage coupled to a second terminal of the circuit breaker and adapted to be actuated by the pin to drive the second terminal to move towards or away from the base part,
      wherein the groove comprises a first segment,
      wherein the second linkage is actuated by the pin and the first linkage is not actuated by the pin when the pin moves within the first segment in a first direction along the predefined path.

2. The adjustment mechanism of claim 1,
   wherein the second linkage comprises a protrusion, and
   wherein when the pin moves within the first segment in the first direction along the predefined path, the pin pushes the protrusion to actuate the second linkage.

3. The adjustment mechanism of claim 1, wherein the first terminal is a terminal for electrical connection, and the second terminal is a terminal for testing.

4. The adjustment mechanism of claim 1,
   wherein the groove further comprises a second segment in communication with the first segment, and
   wherein the first linkage is actuated by the pin and the second linkage is not actuated by the pin when the pin moves within the second segment in the first direction along the predefined path.

5. The adjustment mechanism of claim 4,
   wherein the first linkage further comprises a recessed part between the first and second segments, wherein when the pin moves to an end position in the first direction along the predefined path, the recessed part provides a space for accommodating the pin.

6. The adjustment mechanism of claim 4, further comprising:
   a fourth linkage hinged to the base part at one end; and
   a fifth linkage hinged to the fourth linkage at one end and hinged to the first linkage at the other end,
   wherein when the pin moves within the second segment in the first direction along the predefined path, the first linkage drives the fifth linkage to cause the fourth linkage to rotate with respect to the base part.

7. The adjustment mechanism of claim 6,
   wherein the pin is provided at an end face of a worm gear meshed to a worm, and
   wherein the first linkage, the worm gear and the fifth linkage are arranged such that when the pin moves to an end position of the first segment in the first direction along the predefined path, the fifth linkage is provided approximately tangent to the worm gear.

8. The adjustment mechanism of claim 6,
   wherein the fourth linkage and the fifth linkage are hinged to each other by a lever,
   wherein the frame comprises two hooks coupled to both ends of the lever respectively, and
   wherein when the first linkage moves, the fifth linkage is actuated, such that the lever moves to actuate the frame to move towards or away from the base part.

9. The adjustment mechanism of claim 8,
   wherein the frame further comprises a protruding part,
   wherein the adjustment mechanism further comprises an indicating part adjacent to the protruding part configured to indicate whether the hook is coupled to the lever, and
   wherein when the hook is coupled to the lever, the protruding part detaches from the indicating part.

10. The adjustment mechanism of claim 1,
    wherein the first terminal is arranged on a frame and the second terminal is arranged on a terminal support, and
    wherein the second linkage is hinged to the terminal support.

11. The adjustment mechanism of claim 10, further comprising:
    a third linkage coupled to the frame at one end and hinged to the second linkage at the other end.

12. The adjustment mechanism of claim 11,
wherein the terminal support comprises a bending part along which the pin moves in a second direction opposite to the first direction, and
wherein the first linkage is actuated by the pin and the second linkage is not actuated by the pin when the pin moves along the bending part in the second direction.

13. The adjustment mechanism of claim 1, wherein the pin is provided at an end face of a worm gear meshed to a worm.

14. The adjustment mechanism of claim 13, further comprising:
a stop nut provided at the worm and adapted to limit the range of movement of the worm.

15. A circuit breaker comprising:
an adjustment mechanism,
wherein the adjustment mechanism comprises:
a pin adapted to move with respect to a base part of the circuit breaker along a predefined path;
a first linkage coupled to the base part and adapted to drive a first terminal of the circuit breaker to move towards or away from the base part,
the first linkage comprising a groove in which the pin moves; and
a second linkage coupled to a second terminal of the circuit breaker and adapted to be actuated by the pin to drive the second terminal to move towards or away from the base part,
wherein the groove comprises a first segment,
wherein the second linkage is actuated by the pin and the first linkage is not actuated by the pin when the pin moves within the first segment in a first direction along the predefined path.

16. The circuit breaker of claim 15,
wherein the first terminal is arranged on a frame and the second terminal is arranged on a terminal support, and
wherein the second linkage is hinged to the terminal support.

17. The circuit breaker of claim 15,
wherein the second linkage comprises a protrusion, and
wherein when the pin moves within the first segment in the first direction along the predefined path, the pin pushes the protrusion to actuate the second linkage.

18. The circuit breaker of claim 15,
wherein the pin is provided at an end face of a worm gear meshed to a worm.

19. The circuit breaker of claim 15,
wherein the groove further comprises a second segment in communication with the first segment, and
wherein the first linkage is actuated by the pin and the second linkage is not actuated by the pin when the pin moves within the second segment in the first direction along the predefined path.

20. The circuit breaker of claim 19,
wherein the adjustment mechanism further comprises:
a fourth linkage hinged to the base part at one end; and
a fifth linkage hinged to the fourth linkage at one end and hinged to the first linkage at the other end,
wherein when the pin moves within the second segment in the first direction along the predefined path, the first linkage drives the fifth linkage to cause the fourth linkage to rotate with respect to the base part.

* * * * *